United States Patent [19]

Patrick

[11] Patent Number: 4,711,474
[45] Date of Patent: Dec. 8, 1987

[54] PIPE JOINT SEAL RINGS

[75] Inventor: David H. Patrick, Plano, Tex.

[73] Assignee: Atlantic Richfield Company, Los Angeles, Calif.

[21] Appl. No.: 921,097

[22] Filed: Oct. 21, 1986

[51] Int. Cl.⁴ .............................................. F16L 15/00
[52] U.S. Cl. ................................. 285/332.3; 285/333; 285/355; 285/910; 277/165; 277/227
[58] Field of Search ................. 285/332.3, 332.2, 333, 285/334, 355, 910; 277/165, 227

[56] References Cited

U.S. PATENT DOCUMENTS

| 2,087,185 | 7/1937 | Dillon | 285/332.3 X |
| 2,150,221 | 3/1939 | Hinderliter | 285/332.3 |
| 2,980,451 | 4/1961 | Taylor et al. | 285/333 X |
| 3,322,446 | 5/1967 | Koziol et al. | 285/355 X |
| 3,526,407 | 9/1970 | Chattin et al. | 277/165 X |
| 3,636,824 | 1/1972 | Clark | 277/165 X |
| 3,774,920 | 11/1973 | Sievenpiper | 277/165 |
| 3,811,710 | 5/1974 | Dula et al. | 285/355 X |
| 4,190,259 | 2/1980 | Zitting | 277/165 |
| 4,576,386 | 3/1986 | Benson et al. | 277/165 |

FOREIGN PATENT DOCUMENTS 251625  8/1963  Australia ..................... 285/332.3

Primary Examiner—Thomas F. Callaghan
Attorney, Agent, or Firm—F. Lindsey Scott

[57] ABSTRACT

An improved seal ring comprising a polymeric material ring in combination with a softer polymeric material ring. The seal ring can be used in either male or female fittings and is adapted to seal by mating engagement of the polymeric material with one set of threads and a recess in the other set of threads.

26 Claims, 4 Drawing Figures

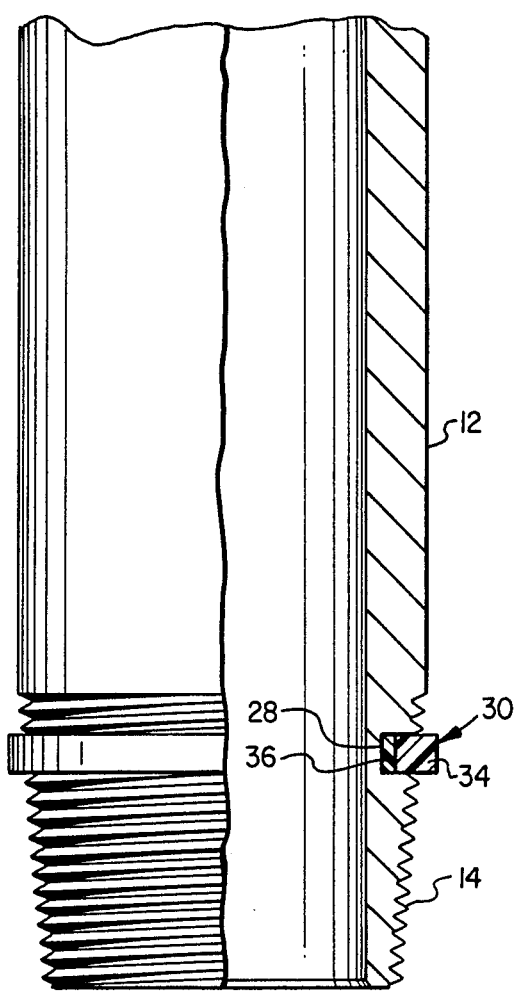
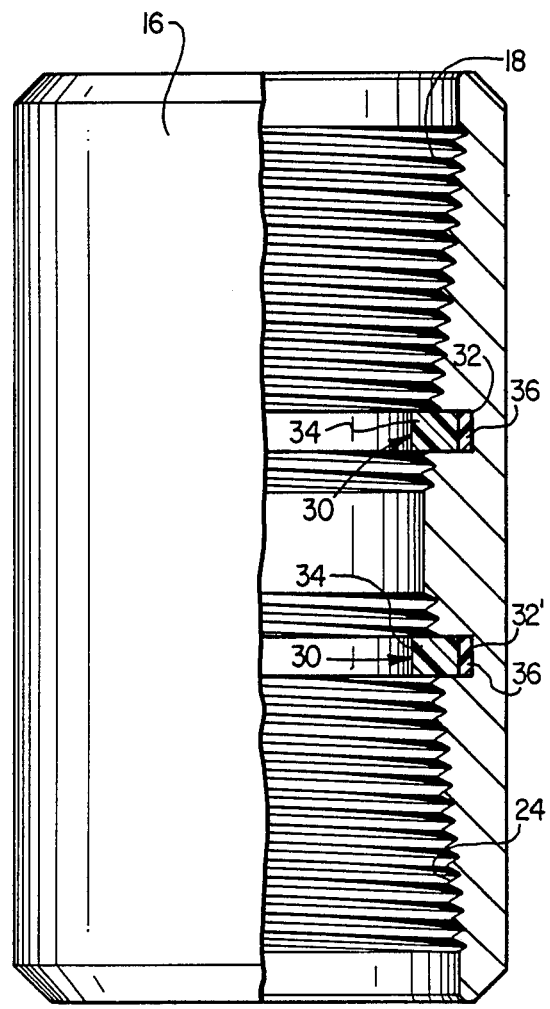
FIG. 3
FIG. 4

PIPE JOINT SEAL RINGS

This invention relates to seal rings for pipe joints.

This invention further relates to polymeric seal rings for use in threaded pipe joints wherein the seal comprises a composite polymeric material.

In many applications where fluids are piped through or around pipes, it is desirable that the pipe joints be sealed. Since in many instances it is desirable to use threaded joints, various methods have been used to attempt to sealingly join pipes by the use of threaded joints. Such methods have included the use of tightly mating shoulders and the like and the use of relatively stiff polymeric sealing rings positioned in a recess in the threads so that when the threads are matingly joined, the threads of the pipe member joining the threads which contain the recess and seal ring cut threads into the polymeric material comprising the seal ring thus closely mating the threads to the polymeric material which is forced into a tight seal with the recess. Materials such as Polytetrafluoroethylene (PTFE) and similar polymeric materials have been used in such applications. Polytetrafluoroethylene of various grades is available and is marketed under the trademark Teflon by E. I. DuPont De Nemours Co. While PTFE is desirable for this use since it is stiff and can be cut by threads, it has been found that PTFE is so stiff that it has tended to deform the pipes at the joint resulting in a loose fit (less than full engagement of the threads) between the threaded pipe sections or fittings resulting in a joint having less tensile strength. Such deformation of the pipe sections, especially the male pipe section, tends to damage and cause to fail plastic materials used to line or coat the inner surfaces of the pipe.

While the use of a strong, stiff polymeric material such as PTFE to form the seal rings has been found effective to seal threaded pipe joints, it would be desrable to accomplish this objective without deformation of the pipe, reduction in the strength of pipe joint or damage to the pipe lining.

According to the present invention, an improved seal is accomplished by positioning a softer polymeric material in the recess behind the polymeric material contacting the threads. The seal ring comprises an inner ring of a polymeric material surrounded by an outer ring of a softer polymeric material when the seal ring is to be used in a recess in a female (box or coupling) pipe fitting. Similarly, the seal ring can comprise an outer ring of polymeric material combined with an inner ring of a softer polymeric material to form the seal ring when the seal ring is to be used in a recess in a male (pin) pipe fitting. Pipe joints may be sealed by the use of one or more seal rings according to the present invention.

FIG. 3 shows a male pipe fitting, including an embodiment of the present invention; and FIG. 4 shows a coupling, including an embodiment of the present invention.

In the discussion of the Figures, the same numbers will be used to refer the same or similar components throughout.

Figure 1:
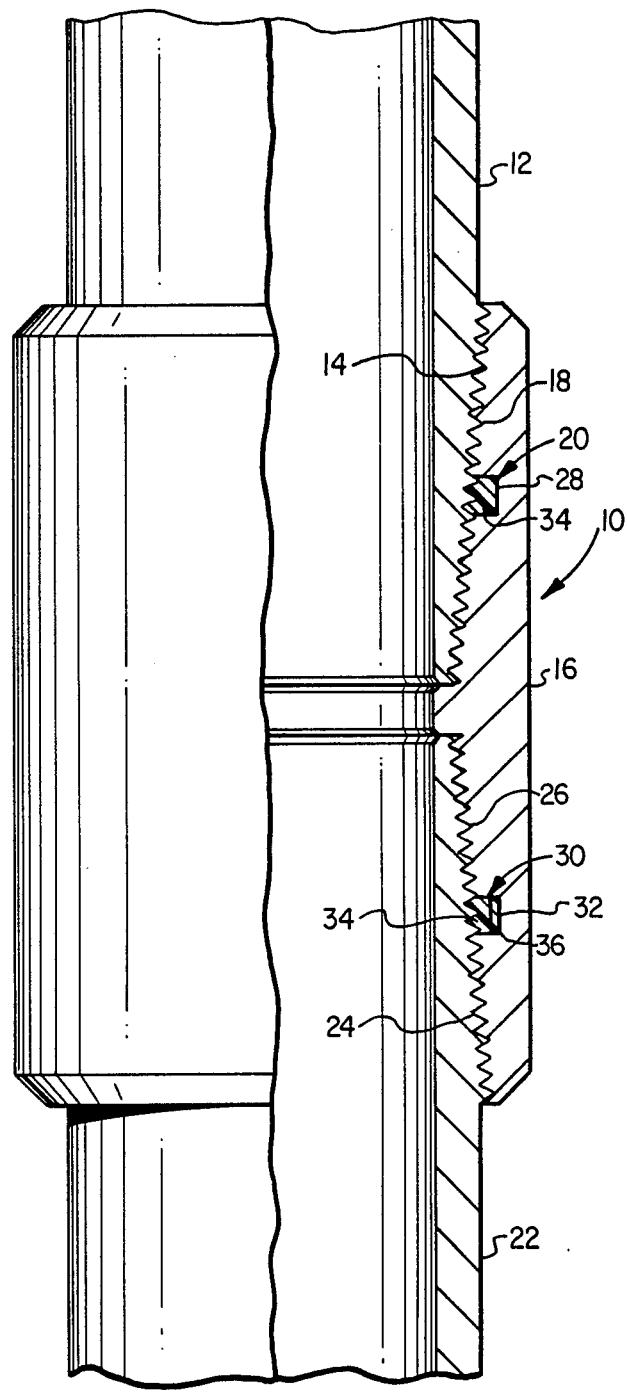
FIG. 1 is a schematic diagram of a threaded pipe joint comprising two pipe sections and a pipe collar and including an embodiment of the present invention.

In FIG. 1, a pipe joint 10 is shown. Pipe joint 10 comprises a pipe section 12, including an external (male) threaded portion 14, in mating engagement with a pipe fittng which comprises a coupling 16, which includes an internal (female) threaded portion 18. A second pipe section 22 is positioned in mating engagement with coupling 16 by way of a male threaded portion 24 on pipe 22 and a female threaded portion 26 in collar 16. A first recess 28 is shown in threaded portion 18 and contains a polymeric material seal ring 20 as known to those skilled in the art. Seal ring 20 is typically formed of a relatively hard polymeric material 34, having a Shore D Scale hardness greater than about 45. In the use of such seal rings, the seal ring is positioned in recess 28 and extends from recess 28, so that when pipe section 12 is screwed into coupling 16, male threaded portion 14 cuts threads into seal ring 20. Unfortunately, polymeric materials having suitable hardness tend to push threads 14 and 18 apart as the joint is tightened. The separation of the threads occurs as a result of deformation of pipe 12, coupling 16 or both. This deformation can result in a less than full engagement of threads 14 and 18 and in deformation of the interior surfaces of pipe 12 in the vicinity of threads 14. Such deformation can break plastic linings loose from the inside of pipe 12 when pipe 12 is plastic coated pipe. Since desirable sealing is accomplished by the use of such seal rings made of such polymeric materials, it is advantageous to continue the use of such polymeric materials even with such disadvantages.

According to the present invention, it has been found that the advantages of the use of seal rings of such polymeric materials can be achieved without the disadvantages discussed above by the use of seal ring 30 as shown in recess 32. Seal ring 30 shown in recess 32 comprises a softer polymeric material 36 positioned in recess 32 behind polymeric material 34. Seal ring 30 thus formed includes a polymeric material positioned to engage male threaded portion 24 of pipe 22 as discussed above. Softer polymeric material 36 in recess 32 behind polymeric material 34 serves to cushion polymeric material 34 while still maintaining sufficient pressure on polymeric material 34 so that male threads 24 cut closely mating threads into polymeric material 34 thus sealingly engaging polymeric material 34 and male threads 24. Since softer polymeric material 36 can yield under the stress of tightening the threads, resulting deformation of the pipe is greatly minimized or eliminated.

Figure 2:
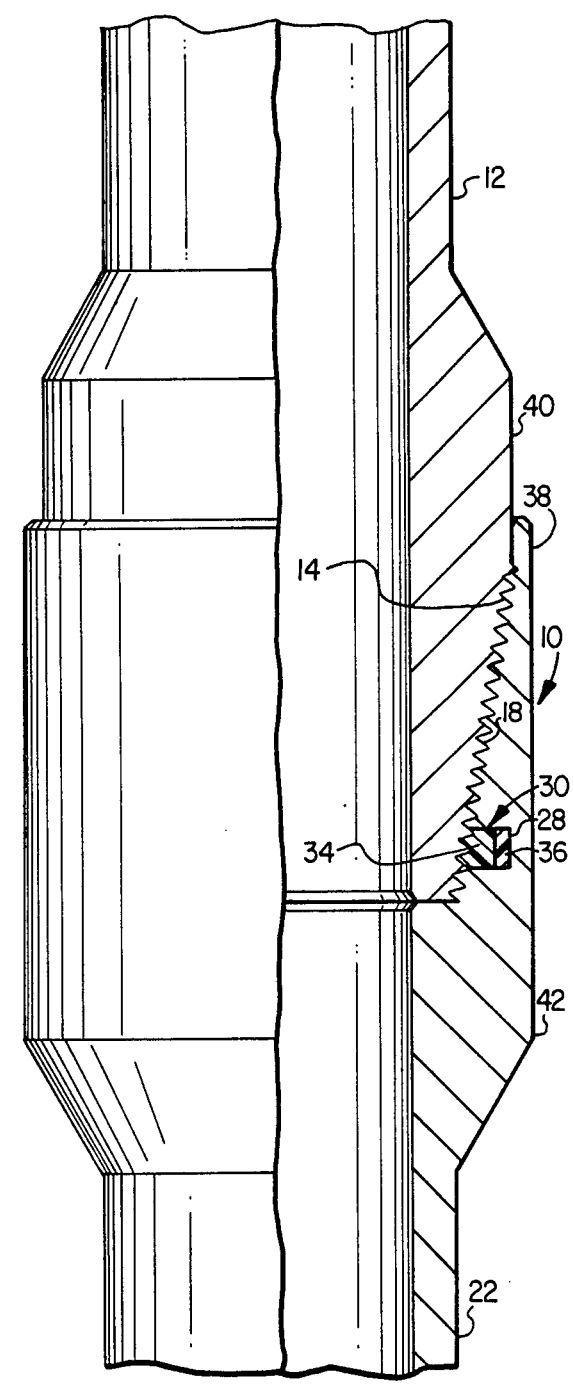
FIG. 2 shows an embodiment of the present invention wherein the male pipe threads and female pipe threads are formed as portions of pipe sections.

In FIG. 2, pipe 12 has an external shoulder 40 and includes a male threaded portion 14 for mating with a female threaded portion 18 positioned in a pipe fitting 38 positioned on second pipe section 22 which also includes an external shoulder 42. Fittings of this type are frequently used in the production of pipes which are desirably leak-proof under pressure. A seal ring 30 is positioned in recess 28 and comprises a polymeric material 34 in engagement with threads 14 with a softer polymeric material 36 being positioned in recess 28 behind polymeric material 30.

When seal ring 30 is positioned in a recess in a female threaded fitting, such as shown in FIG. 2 and in recess 32 in FIG. 1, seal ring 30 is formed of a ring of polymeric material having positioned around its outer circumference, a ring of softer polymeric material. Desirably, the polymeric material is a material having a Shore D Scale hardness greater than about 45 and preferably, at least about 50. PFTE is a preferred material. The softer polymeric material can be selected from a variety of polymeric, and elastomeric materials having a Shore A Scale hardness of at least about 70. Desirably, the Shore A Scale hardness is from about 70 to about 100 and preferably from about 75 to about 85. Some suitable materials are AFLAS[1] fluorocarbon polymers, buna "N", rubber, nitrile, VITON[2] fluorocarbon polymers, and the like. Buna "N" and nitrile are copolymers of butadiene and acrylonitrile. The seal rings typically have a configuration which is generally circular and of a size to closely fit in a recess in the pipe fitting in which the seal ring is to be used. When the seal ring is used in a female fitting, the softer polymeric material is on the outside of the seal ring. Conversely, when the seal ring is to be used in a male fitting, the softer polymeric material is on the inside of the seal ring. Desirably, the polymeric material and the softer polymeric material are closely bonded by vulcanizing, curing and the like as known to those skilled in the art.

[1]Trademark of E. I. DuPont De Nemours Co. for fluorocarbon hydrocarbons
[2]Trademark of E. I. DuPont De Nemours Co. for fluorocarbon hydrocarbons In FIG. 3, a seal ring 30 is shown in recess 28 in a male threaded portion 14 of pipe 12. Seal ring 30 comprises a softer polymeric material 36 and a polymeric material 34. In such embodiments, softer polymeric material 36 is positioned inside polymeric material 34.

FIG. 4 shows a coupling 16 which includes female threads in each end for use in joining pipe sections. Seal rings 30 are shown in both recess 32 and in recess 32'.

Embodiments which use a seal ring in the female pipe fitting are preferred since couplings, such as shown in FIG. 4, can be made up and kept on hand so that conventional pipe sections can be used to produce the sealed pipe string. While in other instances, it may be preferred to use a seal ring on either the male or the female pipe fitting, it is presently preferred that the seal ring be positioned in the female pipe fitting.

The soft polymeric material suitably comprises from about 20 to about 50 percent of the radial width of the combined softer polymeric material and polymeric material. The radial width is measured along the length of a line extending radially, outward from the center of the seal ring and across the width of the seal ring. Preferably, the thickness of the softer polymeric material is from about 20 to about 30 percent of the radial width. As indicated previously, when the seal ring is to be used on a male pipe fitting, the softer polymeric material will be positioned on the inside of the ring and conversely when the seal ring is to be used in a female pipe fitting, the softer polymeric material will be positioned on the outside of the seal ring.

As indicated previously, the use of polymeric material in recesses to from sealed joints in pipe has been known to the art previously. For instance, various embodiments of this type of seal are shown in *World Oil,* January 1985, Page 45. Such seal rings are manufactured and marketed by the Atlas Bradford Company.

The seal rings of the present invention can be installed and used in joints of the types shown in *World Oil* as noted, and the seal rings may be installed in the recesses as known to those skilled in the art.

In the practice of the present invention, the polymeric material is maintained in close contact with the mating threads so that fresh threads are cut into the polymeric material by the mating threads as the joint is assembled, but the stress in the assembled pipe joint generated by the compression of the polymeric material desired for good threads is avoided by the use of the softer polymeric material.

Having thus described the invention by reference to its preferred embodiments, it is respectfully pointed out that many variations and modifications are possible within the scope of the present invention and may be considered obvious and desirable to those skilled in the art upon a review of the foregoing description of preferred embodiments.

Having thus described the invention, I claim:

1. In a threaded pipe joint comprising a pipe section including an external threaded portion and a pipe fitting including an internal threaded portion matingly engaging said external threaded portion wherein at least one polymeric material seal ring means is positioned in at least one recess positioned in at least one of said threaded portions and matingly engages the other threaded portion, the improvement comprising positioning a softer polymeric material on the portion of said polymeric material seal ring opposite the surface of said polymeric material seal ring engaging said other threaded portion.

2. The improvement of claim 1 wherein said polymeric material seal ring means is positioned in a recess in said internal threaded portion and matingly engages said external threaded portion.

3. The improvement of claim 1 wherein said polymeric material seal ring means is positioned in a recess in said external threaded portion and matingly engages said internal threaded portion.

4. The improvement of claim 1 wherein said polymeric material has a Shore D Scale hardness greater than about 45.

5. The improvement of claim 4 wherein said polymeric material is Polytetrafluoroethylene.

6. The improvement of claim 4 wherein said softer polymeric material has a Shore A Scale hardness from about 70 to about 100.

7. The improvement of claim 6 wherein said hardness is from about 75 to about 95.

8. The improvement of claim 6 wherein said softer polymeric material is selected from the group consisting of AFLAS fluorocarbon polymer, buna "N", nitrile and VITON fluorocarbon polymer.

9. The improvement of claim 1 wherein said softer polymeric material comprises from about 20 to about 50 percent of the radial width of said combined polymeric material and said softer polymeric material as measured radially from the center of said seal ring.

10. The improvement of claim 9 wherein said radial width is from about 20 to about 30 percent.

11. In a pipe fitting having an internal threaded portion adapted to matingly engage a pipe having an exterior threaded portion and a recess in said internal threaded portion containing a polymeric material seal ring adapted to matingly engage said exterior threaded portion, the improvement comprising positioning a softer polymeric material outside said polymeric material seal ring in said recess.

12. The improvement of claim 11 wherein said polymeric material has a Shore D Scale hardness greater than about 45.

13. The improvement of claim 12 wherein said polymeric material is Polytetrafluoroethylene.

14. The improvement of claim 11 wherein said softer polymeric material has a Shore A Scale hardness from about 70 to about 100.

15. The improvement of claim 14 wherein said softer material is selected from the group consisting of AFLAS fluorocarbon polymer, buna "N", nitrile and VITON fluorocarbon polymer.

16. The improvement of claim 11 wherein said softer polymeric material comprises from about 20 to about 50 percent of the radial width of said combined polymeric material and said softer polymeric material as measured radially from the center of said seal ring.

17. In a pipe having an external threaded portion adapted to matingly engage a pipe fitting having an internal threaded portion and a recess in said external threaded portion containing a polymeric material seal ring adopted to matingly engage said interior threaded portion, the improvement comprising; positioning a softer polymeric material inside said polymeric material seal ring in said recess.

18. The improvement of claim 17 wherein said polymeric material has a Shore D Scale hardness greater than about 45.

19. The improvement of claim 17 wherein said softer polymeric material has a Shore A Scale hardness from about 70 to about 100.

20. The improvement of claim 17 wherein said softer polymeric material comprises from about 20 to about 50 percent of the radial width of said combined polymeric material and said softer polymeric material as measured radially from the center of said seal ring.

21. A sealing ring comprising an inner ring of a polytetrafluorsethylene having a Shore D Scale hardness of at least about 45 and an outer ring of a softer polymeric material having a Shore A Scale hardness from about 70 to about 100, said inner ring and said outer ring being joined to form said sealing ring.

22. The sealing ring of claim 21 wherein said softer polymeric material is selected from the group consisting of AFLAS, buna "N", nitrile and VITRON fluorocarbon polymer.

23. The sealing ring of claim 21 wherein said outer ring is from about 30 to about 50 percent of the radial width of said sealing ring.

24. A sealing ring comprising an outer ring of a polytetrafluoroethylene having a Shore D Scale hardness of at least about 45 and an inner ring of a softer polymeric material having a Shore A Scale hardness from about 70 to about 100 said inner ring and said outer ring being joined to form said sealing ring.

25. The sealing ring of claim 24 wherein said softer polymeric material is selected from the group consisting of AFLAS fluorocarbon polymer, buna "N", nitrile and VITON fluorocarbon polymer.

26. The sealing ring of claim 24 wherein said inner ring is from about 30 to about 50 percent of the radial width of said sealing ring.

* * * * *